United States Patent [19]
Ruskin

[11] Patent Number: 5,332,160
[45] Date of Patent: Jul. 26, 1994

[54] MULTI-LAYER DRIP IRRIGATION CONDUIT

[75] Inventor: Rodney R. Ruskin, San Francisco, Calif.

[73] Assignee: Agrifim Irrigation International N.V., Curacao, Netherlands Antilles

[21] Appl. No.: 965,963

[22] Filed: Oct. 26, 1992

[51] Int. Cl.5 .................... B05B 1/30; A01G 25/02
[52] U.S. Cl. ................... 239/542; 138/137; 138/141; 405/45
[58] Field of Search ............ 239/542, 547; 405/43, 405/45; 138/137, 141

[56] References Cited

U.S. PATENT DOCUMENTS

| | | | |
|---|---|---|---|
| 2,918,394 | 12/1959 | Smith | 138/137 |
| 3,370,115 | 2/1968 | Wood | 138/137 |
| 3,884,269 | 5/1975 | Schetty et al. | 138/137 |
| 4,037,791 | 7/1977 | Mullett et al. | 239/547 |
| 4,800,109 | 1/1989 | Washizu | 138/137 |
| 4,948,295 | 8/1990 | Pramsoler | 239/542 |
| 5,111,996 | 5/1992 | Eckstein | 239/542 |
| 5,141,360 | 8/1992 | Zeman | 405/43 |
| 5,152,634 | 10/1992 | Maso | 405/45 |
| 5,192,027 | 3/1993 | Delmer et al. | 239/542 |

FOREIGN PATENT DOCUMENTS 861133 9/1986 South Africa.

Primary Examiner—Andres Kashnikow
Assistant Examiner—Christopher G. Trainor
Attorney, Agent, or Firm—Christie, Parker & Hale

[57] ABSTRACT

A water transmission tubing for controlling the flow of water under pressure comprises a tubular inner layer of generally uniform cross-sectional configuration continuous with the length of the tubing and having a biocide for killing bacteria in the water, and a tubular outer layer having an inner wall disposed against and bonded to an outer wall of the inner layer and being made of a material thickness for inhibiting the migration of biocide from the inner layer to the outside of the tubing.

37 Claims, 2 Drawing Sheets

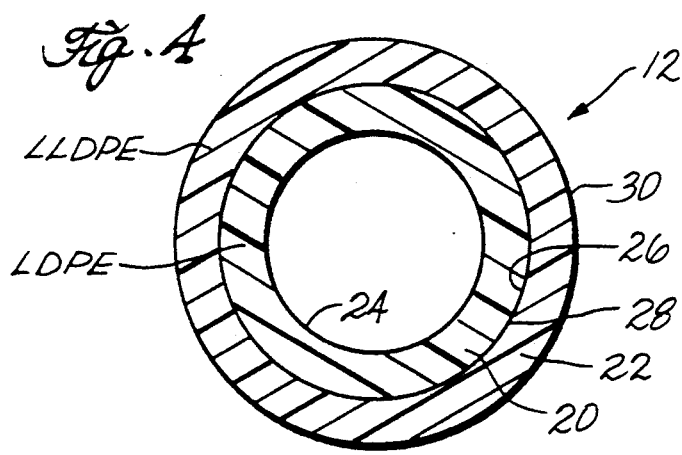
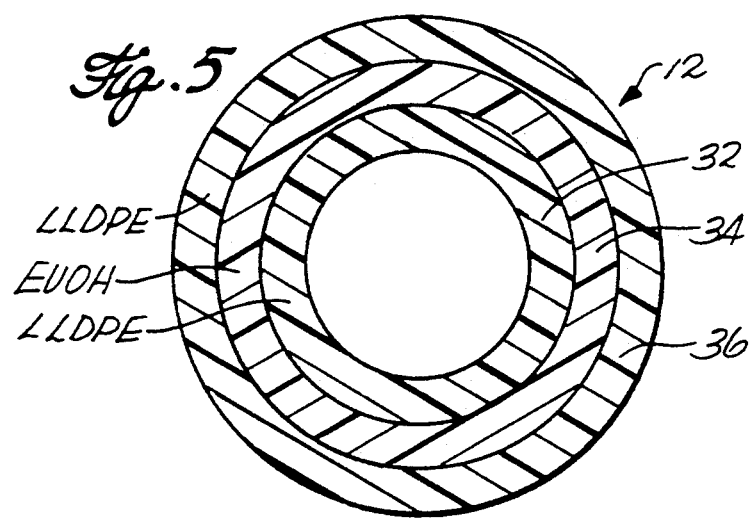
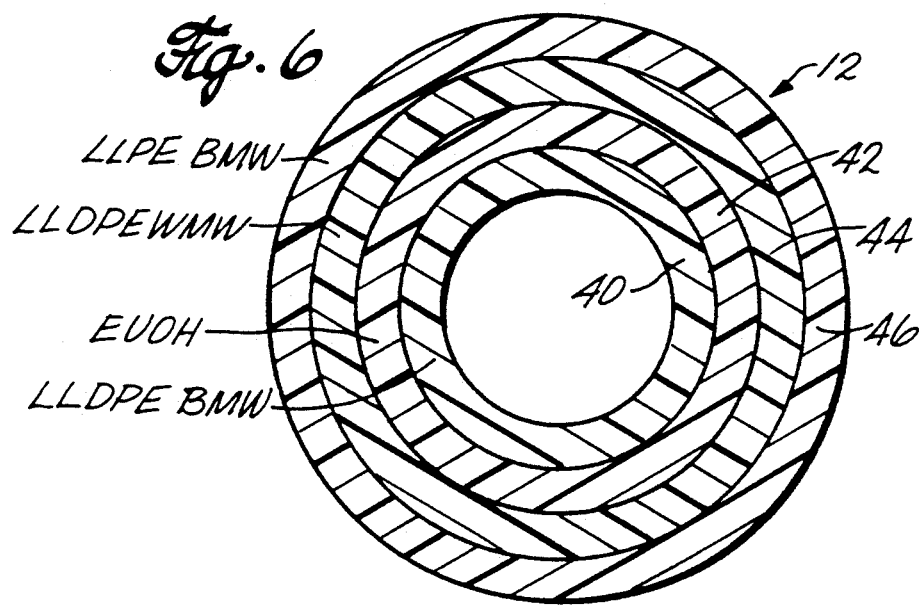

MULTI-LAYER DRIP IRRIGATION CONDUIT

FIELD OF THE INVENTION

This invention relates to drip irrigation, and more particularly, to a drip irrigation line in which the conduit is multi-layered and contains a biocide.

BACKGROUND OF THE INVENTION

Drip irrigation systems usually include a continuous irrigation water supply line with separate emitter units installed on the line or in the line, usually at regular intervals. Irrigation water flows through the supply line under pressure and a small amount of water continuously drips out at the intervals where the drip emitter units are installed. Drip irrigation has proved highly successful in producing greater growth of vegetation with the same amount of water when compared with conventional irrigation techniques.

A common and successful approach for controlling drip flow involves use of separate emitter units installed in or on the supply line. The emitter unit taps off a portion of water flowing in the supply line and passes the water through a labyrinth or other circuitous path that produces a large pressure drop in the water and discharges it at a uniform drip rate. Generally, such pressure reducing labyrinthine emitters are successful because they can use a large enough hole in the supply pipe and a wide enough passage through the labyrinth to avoid clogging in most cases and they can be used at higher line pressures.

Because of life forms in the water flowing through the supply line or drainage line, especially in waste water systems, such as septic tanks or reclaimed water irrigation, slime forms along the inside walls of the tube. As the slime grows, the inner wall loses its smooth surface. Laminar flow within the tube is obstructed by the irregular surface, thereby causing a pressure drop within the tube.

In drip irrigation systems, the growth of the slime also occurs within the emitter unit. Slime grows along the path of the labyrinth and across the hole. As the slime grows within the emitter, the flow of water is reduced or shut off.

To solve the slime problem, several supply lines have been developed containing bactericide for killing the slime-forming bacteria. However, the use of bactericides has several problems.

First, most bactericides are toxic to humans and animals and their usage is governed by the Environmental Protection Agency (EPA). Regulations limit the amount of bactericide that can be placed in the supply line. These regulations limit the toxicity of the bactericide in the pipe thereby limiting the amount of control over the bacteria levels in the pipe.

Second, in present systems people who manufacture, sell, or install the drip irrigation system come in physical contact with the bactericide that is on the surface of the supply lines. The toxicity of the bactericide may cause health problems to those handling the supply lines.

Third, the bactericide in the tube is in contact with the soil thereby releasing it into the soil. The bactericide released into the soil kills useful soil bacteria that consume the sewage bacteria which is emitted by the drip line.

There is a need for an irrigation water supply line having the advantages of those containing a bactericide, while also maintaining low manufacturing costs, having the capability of reducing the amount of bactericide released into the soil, and minimizing contact of persons handling the supply line.

SUMMARY OF THE INVENTION

Briefly, one embodiment of the invention comprises a water transmission tubing for controlling the flow of water under pressure. The tubing has two layers. A tubular inner layer has a general uniform cross sectional configuration continuous with the length of the tubing and has a biocide for killing bacteria in the water flowing through the tubing and contacting the inner layer. A tubular outer layer has an inner wall displaced against and bonded to the outer wall of the inner layer and is made of a material and has a thickness for inhibiting migration of biocide from the inner layer to outside the tubing. In one preferred embodiment, the inner and outer layers are each made of a material so that the difference in crystalinity and molecular structure between the materials inhibits migration of the biocide. The inner layer comprises a low density polyethylene with a broad range of molecular weight. The outer layer comprises a linear low density polyethylene with a broad range of molecular weight. The inner layer is made opaque to electromagnetic radiation, preferably ultraviolet light, harmful to the polyethylene. The outer layer is absorbent of ultraviolet radiation harmful to the tubing. The preferred biocide is -10, 10' oxybisphenoxarsine. The outer layer is color coded by selectively dispersing pigment in the outer layer. The preferred pigment color is purple to indicate that the tubing contains nonpotable water, in accordance with standard industry practice.

A second embodiment of the invention comprises a water irrigation conduit where the conduit has three walls. A tubular inner layer of general uniform cross sectional configuration continuous with the length of the conduit contains a biocide. A tubular intermediate layer has a general uniform cross sectional configuration continuous with the length of the conduit. It is disposed on and bonded to the outer surface of the inner layer. The intermediate layer has a thickness and is made of a material that inhibits the movement of biocide from the inner layer through the intermediate layer. A tubular outer layer has a generally uniform cross sectional configuration continuous with the length of the conduit and surrounds the intermediate layer. In one embodiment having three walls, the inner layer is made of a linear low density polyethylene with a broad range of molecular weight. The intermediate layer is made of one or more ethyl vinyl alcohol copolymers. The outer layer is made of linear low density polyethylene with a broad range of molecular weight. In a second embodiment of the three layer conduit, the inner layer is made of low density polyethylene with a broad range of molecular weight. The intermediate layer is made of linear low density polyethylene with a narrow range of molecular weight. The outer layer is made of linear low density polyethylene with a broad range of molecular weight. The intermediate layer is made of a material that is opaque to ultraviolet radiation harmful to the polyethylene. The outer layer is absorbent of ultraviolet radiation harmful to the tubing. The outer layer is also color coded to indicate the type of water in the tubing.

In a third embodiment of the invention, the tubing is made of four layers. The four layer tubing is similar to the three layer tubing except that the intermediate layer of the three layer tubing is replaced with a first intermediate layer and a second intermediate layer. The first intermediate layer surrounds the outer wall of the inner layer and is made of a material of a thickness that inhibits biocide migrating from the inner layer through the intermediate layer. The second intermediate layer surrounds the first intermediate layer. The second intermediate layer is made of linear low density polyethylene with a narrow range of molecular weights. The second intermediate layer is made of a material that is opaque to ultraviolet radiation harmful to the polyethylene.

BRIEF DESCRIPTION OF THE DRAWINGS

FIG. 4 is a cross-sectional view illustrating a two-layer supply line.

FIG. 5 is a cross-sectional view illustrating a three-layer supply line.

FIG. 6 is a cross-sectional view illustrating a four layer supply line.

FIGS. 4 through 6 are shown with layer thickness and relative dimensions exaggerated in size and proportion, for clarity.

DETAILED DESCRIPTION

FIGS. 1–4 schematically illustrate a two-layer drip irrigation supply line.

Figure 1:
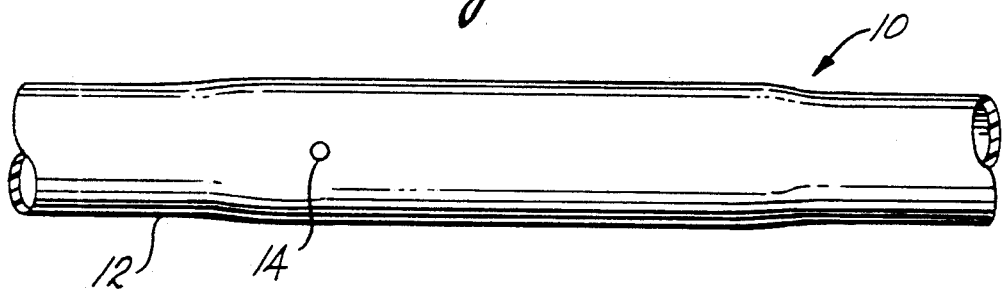
FIG. 1 is a schematic-perspective view illustrating a supply line according to the principles of this invention.

FIG. 1 is a schematic view illustrating a supply line according to the principles of this invention. A supply line 10 is comprised of a conduit 12 having a plurality of fluid discharge ports 14 spaced apart longitudinally along the length of the supply line.

Figure 2:
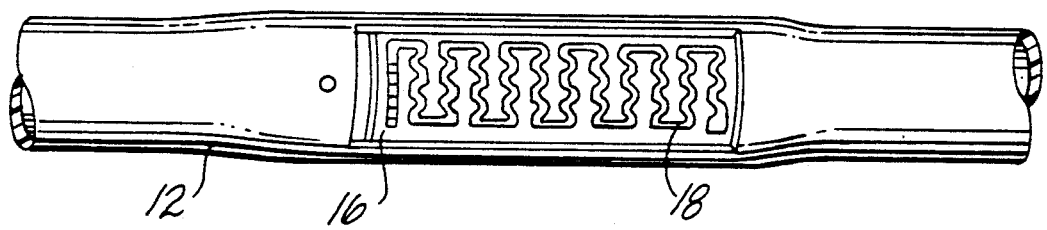
FIG. 2 is a fragmentary view illustrating the emitter within the supply line shown in FIG. 1.
Figure 3:
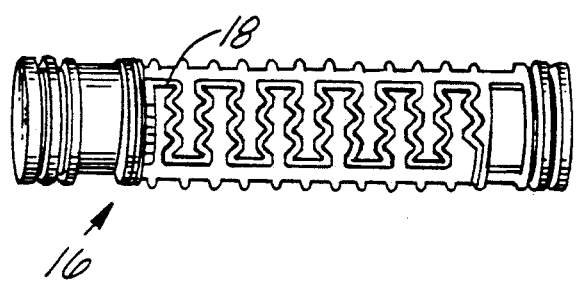
FIG. 3 is a schematic view illustrating the emitter shown in FIG. 2.

FIG. 2 is a fragmentary plan view illustrating an emitter 16 disposed within the conduit 12. FIG. 3 is a schematic view illustrating the emitter 16 shown in FIG. 2. The preferred embodiment uses an emitter inside the conduit. In an alternate embodiment, the emitter is outside the conduit. For example, this invention may be applied to the drip irrigation system disclosed in U.S. Pat. No. 5,052,625 to Ruskin which shows an emitter outside the conduit.

Although the invention is shown in a drip irrigation system, the invention may also be used in other water or fluid transmission systems in which slime-forming or other harmful bacteria inhabit the water or the fluid transmitted therein.

The emitter 16 has a water-entry port (not shown) for allowing water to flow from the inside of the conduit 12 into a labyrinth 18 disposed on the outer surface of the emitter. The labyrinth 18 is a narrow passage that circuitously channels the water to generate a turbulent flow. The turbulent flow keeps fine particles in suspension. The raised water-entry ports into the emitter 16 reduce the risk of solids plugging the emitter flow path. The water flows through the labyrinth 18 and out of the fluid discharge port 14 and into the soil (not shown).

FIG. 4 is a cross-sectional view of the conduit 12. The conduit preferably has a circular cross section. However, the principles of this invention apply to any cross sectional shape. The conduit 12 comprises an inner layer 20 and an outer layer 22. The inner layer 20 and the outer layer 22 each have a circular cross section and a uniform wall thickness. The inner layer 20 has an inside surface 24 facing towards the center of the conduit to form a tubular enclosed region for containing water or other fluids within the conduit. The inner layer 20 also has an outside surface 26. The outer layer 22 has an inside surface 28 in contact with the outside surface 26 of the inner layer 20. The layers are bonded together by structural co-extrusion techniques. The outer layer 22 has an outside surface 30 exposed to the soil, the sunlight and air. As mentioned, the conduit is preferably formed by coextrusion which is well-known in the electrical cable and packaging industry.

The inside layer 20 is preferably made of a low-density polyethylene (LDPE) and has a broad range of molecular weight (BMW). The broad range makes the inner layer 20 easier to extrude with a smooth finish. The smooth finish allows water flow inside the conduit to be laminar. The inner layer 20 also contains a biocide for killing slime-forming bacteria on the inside surface 24 and in the water in the conduit. The biocide leaches out from the inner layer 20 and onto the inside surface 24. The preferred biocide is a bactericide -10,10' oxybisphenoxarsine.

The outer layer 22 is made of a material and has a thickness to inhibit the migration or movement of biocide from the inner layer 20, through the outer layer 22, and to the exterior of the conduit. The outer layer 22 is preferably made of a linear low-density polyethylene (LLDPE) and also has a broad range of molecular weight. A smooth finish on the outer surface 30 is desired to make handling and installation of the conduit easier. Because polyethylene is degraded by exposure to sunlight, especially ultraviolet light, an ultraviolet absorber is added to the outer layer 22. Because many absorbers degrade with prolonged exposure to ultraviolet light, the inner layer 20 is made opaque, preferably by dispersed carbon black pigment. In a preferred embodiment, the outer layer 22 contains a pigment dispersed throughout. In the preferred embodiment, the pigment is purple. Purple is an industry standard indicating that the pipe contains nonpotable water. Alternatively, the outer layer 22 may contain color stripes for fluid-type identification.

In an alternate embodiment, the inner layer 20 and the outer layer 22 are both made of the same type of polyethylene, for example, linear low-density polyethylene. The inner layer 20 contains biocide. A single layer conduit having a gradient of concentration of biocide with the highest concentration on the inside surface and the least concentration on the outside surface may alternatively be used. The two layer conduit is less expensive to manufacture using co-extrusion then extruding a single layer with a concentration gradient.

FIG. 5 is a cross-sectional view of an alternate embodiment of the invention illustrating a conduit having three layers. In this embodiment, the conduit 12 has an inner layer 32, an intermediate layer 34, and an outer layer 36. The embodiment of FIG. 5 is similar to that of FIG. 4. The inner layer 32 is preferably made of a linear low-density polyethylene. The inner layer 32 also contains a biocide. The intermediate layer 34 is made of a barrier resin such as ethyl vinyl alcohol copolymers (EVOH). The barrier resin functions to inhibit easy movement of biocide from the inner layer 32 to the outer layer 36. The barrier resin is chosen to be a different but compatible polymer with the polyethylene. The use of barrier resins in the packaging industry is well known in the art. The intermediate layer 34 is opaque, preferably black, to protect the polyethylene from sunlight. The outer layer 36 is made of a layer of linear low-density polyethylene and has a broad range of molecular weight. The outer layer 36 also contains an ultraviolet absorber and is purple in color to indicate that it contains nonpotable water.

Each layer of the conduit 12 is preferably sufficiently thin so that the conduit is flexible. Drip irrigation supply lines are rolled onto large spools during manufacture. The supply lines are installed into the ground by unrolling the line from the spool, and a vibratory plow or trencher buries the line.

In an alternate embodiment to FIG. 5, the physical structure is unchanged, but the materials are different. The inner layer 32 is made of low-density polyethylene with a broad range of molecular weight. The intermediate layer 34 is a linear low-density polyethylene of a narrower range of molecular weight (NMW). The narrower range in molecular weight polyethylene provides a poor finish that is not as smooth as the broad range of weight polyethylene. However, because water does not flow along the surface of the intermediate layer, nor is the intermediate layer directly handled, a smooth finish is unnecessary. The use of narrower range in molecular weight material is less expensive than the broad range of molecular weight material. The intermediate layer 34 is also opaque, preferably black, to protect the inner layer 32. The outer layer 36 is made of a linear low-density polyethylene that is of a broad range of molecular weight. The interface between the inner layer 32 and the intermediate layer 34 is an interface of low-density polyethylene of a broad range of molecular weight and linear low-density polyethylene of narrower range of molecular weight. Similarly, the interface between the intermediate layer 34 and the outer layer 36 is a linear low-density polyethylene of narrower range in molecular weight and the linear low-density polyethylene of the broad range of molecular weight. These interfaces are designed to inhibit easy movement of the biocide across the interface due to the difference in crystalinity and molecular structure between the two materials.

FIG. 6 is a cross sectional view of an alternate embodiment of the invention illustrating a conduit having four layers. Conduit 12 has in inner layer 40, a first intermediate layer 42, a second intermediate layer 44, and an outer layer 46. The inner layer 40 is preferably made of a linear low density polyethylene of broad range of molecular weight. The inner layer 40 also contains a biocide. The first intermediate layer 42 is made of barrier resin such as ethyl vinyl alcohol copolymers (EVOH). The second intermediate layer 44 is preferably made of a linear low density polyethylene of a narrow range of molecular weight and is opaque preferably black to protect the polyethylene from sunlight. The outer layer 46 is preferably made of linear low density polyethylene with a broad range of molecular weight. The outer layer 46 also contains an ultra violet absorber and is purple to indicate that the pipe contains nonpotable water.

While preferred embodiments of the invention have been shown and described, it is to be understood that various other adaptations and modifications may be made within the spirit and scope of the invention. It is thus intended that the invention be limited in scope only by the appended claims.

What is claimed is:

1. A water transmission tubing for controlling the flow of water under pressure comprising:

a multiple-wall conduit comprising at least a tubular inner wall having an inner surface in contact with water traveling in the conduit and a tubular outer wall exposed to the exterior of the conduit and bonded to and surrounding the inner wall, the tubular inner and outer walls each extending continuously for the length of the multiple-wall conduit and each being substantially continuous around the cross-section of the conduit, a tubular inner wall comprising a polymeric material containing a biocide dispersed throughout the inner wall so as to kill slime-forming bacteria in the water traveling in the conduit and for preventing the growth of slime on the inner surface of the tubular inner wall, the tubular outer wall comprising a polymeric material substantially devoid of said biocide and having a thickness sufficient to form a continuous barrier for inhibiting the migration of the biocide from the inner wall through the outer wall to the exterior of the conduit.

2. The water transmission tubing of claim 1 wherein the inner wall and the outer wall are each made of substantially similar material.

3. The water transmission tubing of claim 1 wherein the inner and outer walls are each made of a material so that the difference in crystalinity and molecular structure between the materials inhibits the migration of the biocide.

4. The water transmission tubing of claim 1 further comprising a plurality of emitters disposed in spaced apart relation along the length of the tubing for regulating the flow of the water from the inside of the tubing to outside the tubing.

5. The water transmission tubing of claim 1 where the inner wall is comprised of low-density polyethylene with a broad range of molecular weight.

6. The water transmission tubing of claim 5 where the outer wall is comprised of a linear low-density polyethylene with a broad range of molecular weight.

7. The water transmission tubing of claim 1 where the inner wall is made of a material that is opaque to electromagnetic radiation harmful to the tubing.

8. The water transmission tubing of claim 7 wherein the electromagnetic radiation is ultraviolet light.

9. The water transmission tubing of claim 1 wherein the outer wall is absorbent of electromagnetic radiation harmful to the tubing.

10. The water transmission tubing of class 9 wherein the electromagnetic radiation is ultraviolet light.

11. The water transmission tubing of claim 1 where the biocide is -10,10′ oxybisphenoxarsine.

12. The water transmission tubing of claim 1 in which the outer wall is color coded to indicate the type of water in the tubing.

13. The water transmission tubing of claim 12 in which the color coding is pigment selectively dispersed in the outer wall.

14. The water transmission tubing of claim 1 wherein the inner wall is a polymeric material containing a dispersed biocide which leaches out from the inner wall into the water flowing in the conduit.

15. The water transmission tubing of claim 1 wherein the outer wall has a polymeric material.

16. The water transmission tubing of claim 15 wherein the outer wall is absorbent of electromagnetic radiation harmful to the tubing and is color coded to indicate the type of water in the tubing.

17. The water transmission tubing of claim 16 wherein the electromagnetic radiation is ultraviolet light.

18. The water transmission tubing of claim 1 wherein the inner and outer walls are flexible.

19. The water transmission tubing of claim 1 wherein the inner and outer walls are weatherable.

20. A water transmission tubing of claim 1 in which an emitter comprising a tubular body having a labyrinthine channel is inserted into the conduit, and in which the water traveling in the conduit passes through an inlet to the labyrinthine channel, through the channel, and then through a dispensing hole passing through the inner and outer walls of the conduit from the channel.

21. The water transmission tubing of claim 20 in which the inner and outer walls are formed by co-extrusion.

22. A water irrigation conduit for conducting the flow of water under pressure comprising:
   a multiple-wall conduit comprising at least a tubular inner wall having an inner surface in contact with water traveling in the conduit, a tubular intermediate wall bonded to and surrounding the inner wall, and a tubular outer wall exposed to the exterior of the conduit and bonded to and surrounding the intermediate wall, the tubular inner, intermediate and outer walls each extending continuously for the length of the multiple wall conduit and each being substantially continuous around the cross-section of the conduit,
   the tubular inner wall comprising a polymeric material containing a biocide dispersed throughout the inner wall so as to kill slime-forming bacteria in the water traveling in the conduit and for preventing the growth of slime on the inner surface of the tubular inner wall,
   the tubular intermediate wall comprising a polymeric material substantially devoid of said biocide and having a thickness that inhibits migration of the biocide from the inner wall through the intermediate wall,
   the tubular outer wall forming a protective and weatherable barrier around the exterior of the multiple-wall conduit.

23. The water irrigation conduit of claim 22 further comprising:
   a plurality of emitters disposed in spaced-apart relation along the length of the conduit, each emitter regulating the flow of water from the conduit through the emitter so that the flow of water is substantially uniform and the pressure of the water in the conduit is substantially unchanged.

24. The water irrigation conduit of claim 22 where the inner wall is made of a linear low-density polyethylene with a broad range of molecular weight, the intermediate wall is made of ethyl vinyl alcohol copolymers, and the outer wall is made of linear low-density polyethylene with a broad range of molecular weight.

25. The water irrigation conduit of claim 22 where the inner wall is made of low-density polyethylene with a broad range of molecular weight, the intermediate wall is made of linear low-density polyethylene with a narrower range of molecular weight, and the outer wall is made of linear low-density polyethylene with a broad range of molecular weight.

26. The water irrigation conduit of claim 22 where the biocide is -10,10' oxybisphenoxarsine.

27. The water irrigation conduit of claim 22 wherein the inner and intermediate walls are each made of a material so that the difference in crystalinity and molecular structure between the material inhibits the migration of the biocide.

28. The water irrigation conduit of claim 22 wherein the intermediate wall is made of a material that is opaque to the electromagnetic radiation harmful to the conduit.

29. The water irrigation conduit of claim 28 wherein the electromagnetic radiation is ultraviolet light.

30. The water irrigation conduit of claim 22 wherein the outer wall is absorbent of electromagnetic radiation harmful to the conduit.

31. The water irrigation conduit of claim 30 wherein the electromagnetic radiation is ultraviolet light.

32. The water irrigation conduit of claim 22 wherein the outer wall is color coded to indicate the type of water in the tubing.

33. The water transmission tubing of claim 32 wherein the color coding is pigment selectively disbursed in the outer wall.

34. A water transmission tubing for controlling the flow of water under pressure of comprising:
   the tubular inner layer of general uniform cross section configuration continuous with the length of the tubing and having a biocide for killing bacteria in the water,
   a tubular first intermediate layer of general uniform cross sectional configuration continuous with the length of the tubing disposed on and bonded to the outer surface of the inner layer, and having a thickness and being made of a material that inhibits the movement of biocide from the inner layer through the first intermediate layer,
   a tubular second intermediate layer with general uniform cross sectional configuration continuous with the length of the tubing disposed on and bonded to the outer surface of the first intermediate layer and being made of a first material that is opaque to electromagnetic radiation harmful to the tubing, and
   a tubular outer layer of general uniform cross section configuration continuous with the length of the tubing disposed on and bonded to the outer surface of the second intermediate layer and being made of a second material that is absorbent of electromagnetic radiation harmful to the tubing.

35. The water transmission tubing of claim 34 wherein the electromagnetic radiation is ultraviolet light.

36. The water transmission tubing of claim 34 further comprising a plurality of emitters disposed and space apart in relation along the length of the conduit, each emitter regulating the flow of water from the conduit through the emitters so that the flow of water is substantially uniform and the pressure of the water in the conduit is substantially unchanged.

37. The water transmission tubing of claim 34 where the inner wall is comprised of a linear low-density polyethylene with a broad range of molecular weight, the first middle wall is comprised of ethyl vinyl alcohol polymers, the second middle wall is comprised of linear low-density polyethylene with the narrower range of molecular weight, and the outer wall is comprised of a linear low-density polyethylene of a broad range of molecular weight.

* * * * *

UNITED STATES PATENT AND TRADEMARK OFFICE
CERTIFICATE OF CORRECTION

PATENT NO. : 5,332,160
DATED : July 26, 1994
INVENTOR(S) : Rodney R. Ruskin

It is certified that error appears in the above-indentified patent and that said Letters Patent is hereby corrected as shown below:

On the title page, item

[56] Refences Cited, U.S. PATENT DOCUMENTS, insert the following reference:

-- 5,116,414   05/1992   Burton et al....71/121 --

In the Claims:

Column 6, line 49, change "class 9" to -- claim 9 --.
Column 7, line 8, before "water" change "A" to
          -- The --.
Column 8, line 24, after "pressure" delete "of".
Column 8, line 26, change "cross section" to
          -- cross sectional --.
Column 8, line 43, change "cross section" to
          -- cross sectional --.
Column 8, line 53, after "disposed and" change "space"
          to -- spaced --.

Signed and Sealed this

Fourth Day of April, 1995

Attest:

BRUCE LEHMAN

Attesting Officer        Commissioner of Patents and Trademarks